US008340236B2

United States Patent
Haentzschel et al.

(10) Patent No.: US 8,340,236 B2
(45) Date of Patent: Dec. 25, 2012

(54) CIRCUIT FOR A RADIO SYSTEM, USE AND METHOD FOR OPERATION

(75) Inventors: Dirk Haentzschel, Porschendorf (DE); Lutz Dathe, Dresden (DE)

(73) Assignee: Atmel Corporation, San Jose, CA (US)

( * ) Notice: Subject to any disclaimer, the term of this patent is extended or adjusted under 35 U.S.C. 154(b) by 508 days.

(21) Appl. No.: 12/578,871

(22) Filed: Oct. 14, 2009

(65) Prior Publication Data

US 2010/0091923 A1    Apr. 15, 2010

Related U.S. Application Data

(60) Provisional application No. 61/105,095, filed on Oct. 14, 2008.

(30) Foreign Application Priority Data

Oct. 14, 2008 (DE) .......................... 10 2008 051 222

(51) Int. Cl.
*H04L 7/00*    (2006.01)

(52) U.S. Cl. ........ 375/354; 375/355; 375/364; 375/373; 375/320; 370/335

(58) Field of Classification Search .................. 375/355, 375/364, 354, 373, 260, 317; 370/335

See application file for complete search history.

(56) References Cited

U.S. PATENT DOCUMENTS 5,941,990 A * 8/1999 Hiiragizawa .................. 713/310
6,629,256 B1 9/2003 Ilan et al.
6,901,126 B1 * 5/2005 Gu ................................. 375/355
7,403,507 B2 * 7/2008 McDonough et al. ........ 370/335
2010/0046685 A1 * 2/2010 Liu ............................... 375/364

OTHER PUBLICATIONS

Chinese First Office Action and English Translation of Text of the First Office Action, Patent Appl. No. 200910204233.2, Ser. No. 2012/042400828190, Ref. USBBL69746-gy, file 080900.1037, dated Mar. 1, 2012 and received Jun. 29, 2012 (5 pgs).

* cited by examiner

*Primary Examiner* — Eva Puente
(74) *Attorney, Agent, or Firm* — Baker Botts L.L.P.

(57) ABSTRACT

A circuit and method of operation for a circuit of a radio system in which a system time is divided into symbols, in which a system clock generator is activated in an operating mode, so that the system time is determined from an output clock signal of the system clock generator by counting, in which the system clock generator is deactivated in a sleep mode, in which an output clock signal of a sleep clock generator is blanked as a function of an output signal of a modulo divider in the sleep mode, and the system time is determined by counting, wherein an output frequency of the output clock signal of the sleep clock generator is a non-integer multiple of a symbol frequency, in which the modulo divider divides the output clock signal of the sleep clock generator by a division factor, and in which the division factor of the modulo divider is produced by changing between at least two integer divisor values.

14 Claims, 1 Drawing Sheet

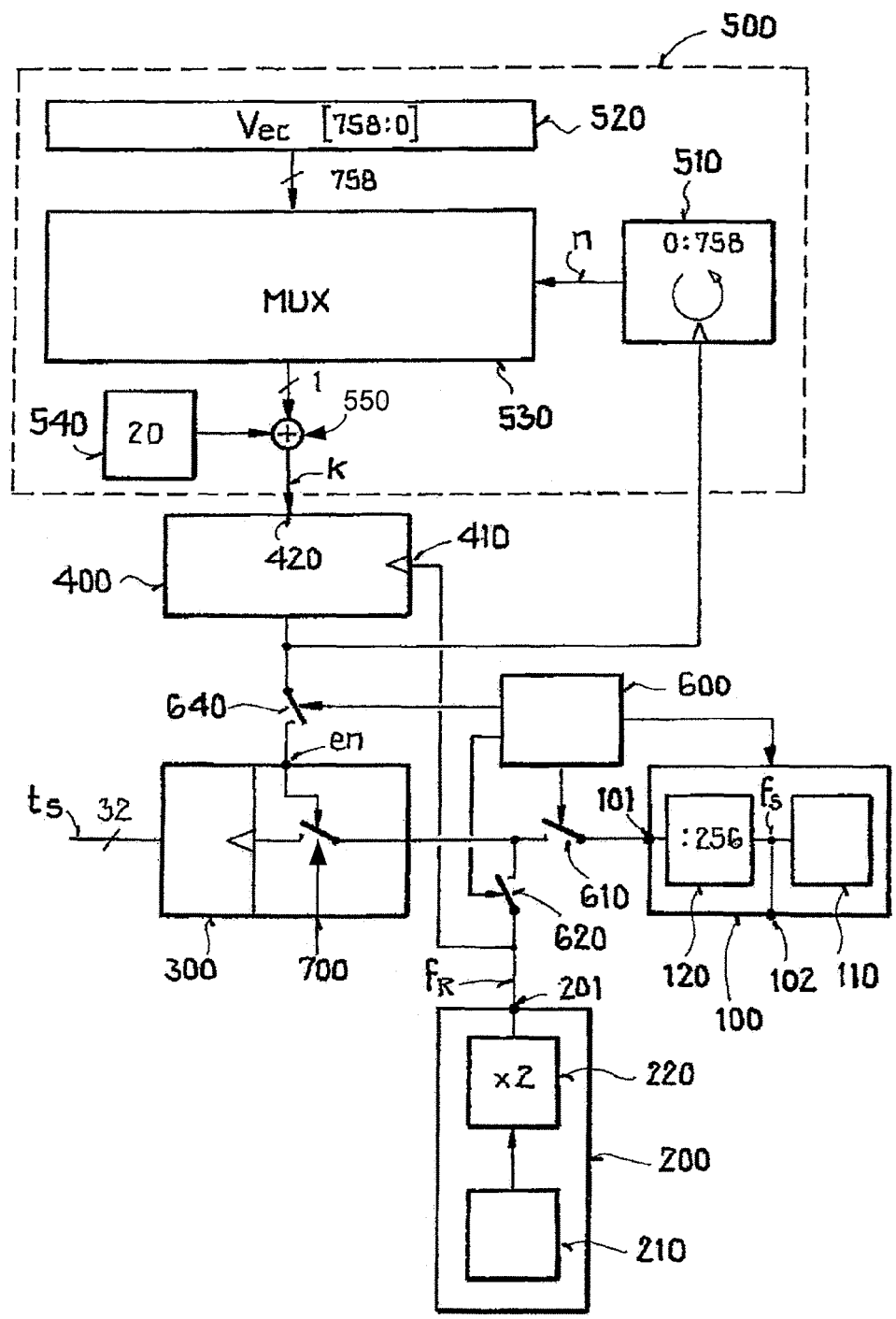

CIRCUIT FOR A RADIO SYSTEM, USE AND METHOD FOR OPERATION

This nonprovisional application claims priority to German Patent Application No. DE 10 2008 051 222.2, which was filed in Germany on Oct. 14, 2008, and to U.S. Provisional Application No. 61/105,095, which was filed on Oct. 14, 2008, and which are both herein incorporated by reference.

BACKGROUND OF THE INVENTION

1. Field of the Invention

The present invention relates to a circuit for a radio system, a use, and a method for operating a circuit of a radio system.

2. Description of the Background Art

A radio system is, for example, a radio network in accordance with an industry standard, such as IEEE 802.15.4. Within the radio system, a synchronization of the system time of all subscribers to the radio system, in particular of all nodes of a radio network, may be desirable.

SUMMARY OF THE INVENTION

It is an object of the present invention to improve a circuit for a radio system to the greatest extent possible.

Accordingly, a circuit for a radio system is provided. In the radio system, a system time is divided into symbols as time units. The circuit has a symbol counter. The symbol counter is designed to provide a system time at its output for the circuit from a number of counted symbols.

A system clock generator can be connected to the symbol counter, for example by means of a gate, a semiconductor switch, or fixed wiring. The system clock generator has a first quartz crystal whose frequency is an integer multiple of a symbol frequency. The symbol frequency is defined by a number of symbols per second. The system clock generator has a frequency divider to output symbols to be counted in an operating mode. To this end, the frequency divider is designed to divide the frequency of the first quartz crystal and is connected to the first quartz crystal.

The circuit has a sleep clock generator with a second quartz crystal. The output frequency of an output clock signal of the sleep clock generator is a non-integer multiple of the symbol frequency. The output frequency is thus higher than the symbol frequency. The symbol frequency cannot be obtained through integer division of the output clock signal, however.

The circuit has a switch that is designed to produce the symbols to be counted by blanking the output clock signal of the sleep clock generator in a sleep mode. In this regard, the circuit is designed for a reduction of the power consumption in sleep mode as compared to the power consumption in operating mode. To this end, a number of functions of the operating mode of the circuit are deactivated in the sleep mode. The blanking causes a subtraction from pulses of the output clock signal. For example, the output clock signal of the sleep clock signal has pulses in the form of square-wave signals with a rising edge and a falling edge. Individual square-wave signals are masked off for blanking, for example. By means of the blanking, clocks of the output clock signal are thus not read for determining the system time. The switch is, e.g., a logic element such as, e.g., an AND gate or, e.g., a transmission gate, or, e.g., a semiconductor switch in the form of a transistor.

The circuit can have a modulo divider that is connected to an output of the sleep clock generator. The modulo divider can be switched between at least two integer divisor values. Preferably, the modulo divider is switchable between exactly two values, for example 20 and 21. A modulo divider always produces a signal at its output upon reaching its divisor value, with which the counting of a pulse is suppressed. For example, every twentieth or twenty-first pulse of the sleep clock generator is not counted.

The output of the modulo divider is connected to a control input of the switch to blank out the output clock signal by means of the modulo divider. The output values of the modulo divider control the switching state of the switch here.

The circuit can have a logic element that is connected to a control input of the modulo divider. The logic element is designed to control a division factor of the modulo divider by changing a value of the divisor of the modulo divider. To change the at least two integer divisor values, the modulo divider is preferably designed for loading of the divisor value from the logic element through its control input. Alternatively, for changing the divisor value it is possible for the modulo divider to be designed such that fixed or programmable divisor values stored therein can be selected through switchover by means of a control signal of the logic element at the control input.

The invention has the additional object of providing a method for operation. Accordingly, a method for operating a circuit for a radio system is provided in which a system time is divided into symbols as time units.

In an operating mode, a system clock generator can be activated. In the operating mode, the system time can be determined from an output clock signal, preferably by counting the pulses of the output clock signal of the system clock generator. Preferably, the pulses of the output clock signal of the system clock generator correspond to the symbols of the system time.

The system clock generator can be deactivated in a sleep mode. In the sleep mode, an output clock signal of a sleep clock generator is blanked as a function of an output signal of a modulo divider. The system time is preferably determined by counting remaining pulses of the blanked output clock signal of the sleep clock generator.

An output frequency of the output clock signal of the sleep clock generator can be a non-integer multiple of a symbol frequency here. The output frequency of the sleep clock generator is thus higher than the symbol frequency. The symbol frequency cannot be obtained through integer division of the output clock signal, however.

The modulo divider provides the signal at the output for blanking as a function of a division factor and the output clock signal of the sleep clock generator. The division factor of the modulo divider is produced by changing between at least two integer divisor values. Preferably, the modulo divider can be changed between exactly two values, for example by switchover.

The invention has a further object of providing a use. Accordingly, a use of a quartz crystal of a real-time clock (RTC) to provide a system time divided into symbols in a radio system during a sleep mode is provided. A quartz crystal of a real-time clock preferably has a lower power consumption than a (higher-frequency) quartz crystal of a system clock generator. The quartz crystal of the real-time clock advantageously has a quartz crystal frequency of 32.768 KHz or a multiple thereof.

A frequency multiplier is designed for integer multiplication of the quartz crystal frequency of the quartz crystal of the real-time clock. For example, the quartz crystal frequency is doubled by the frequency multiplier.

A switch can be designed for blanking the multiplied quartz crystal frequency of the quartz crystal as a function of an output signal of a modulo divider.

A division factor of the modulo divider can be produced by changing between at least two integer divisor values. Within the means, the blanking of individual pulses of the sleep clock generator by means of the output signal of the modulo divider results in a non-integer division ratio between the output frequency of the sleep clock generator and the counting frequency of the symbol counter. For example, the division ratio is 1:1.048576.

A logic element can be designed to change the integer divisor values of the modulo divider, for example by switchover between two divisor values. In this regard, the logic element is designed such that an input frequency at the input of a symbol counter is approximated to a predetermined symbol frequency by the blanking and the changing of the integer divisor values. The symbol counter is designed to provide the system time from a number of counted symbols. The symbol time can thus exhibit a small count error on account of the approximation.

The various embodiments described below relate to the circuit, as well as the use and the method.

The symbol can be a time unit of the system time. In contrast, a transmission symbol is a unit of information in information technology. A transmission symbol preferably always has the same length, but contains a different number of data bits depending on the transmission rate. The number of transmission symbols defined in an encoding method for transmission can be described as a constellation. It is possible for a time duration of a symbol counted by the symbol counter to be different from a duration of a transmission symbol. For example, the symbol duration of the system time is an integer multiple or an integer fraction of the duration of a transmission symbol. In a preferred refinement, the duration of the transmission symbol and the symbol duration match.

According to an embodiment, the circuit of the radio system has a control circuit that is designed to activate the system clock generator for the operating mode and deactivate the system clock generator for the sleep mode. To this end, the control circuit advantageously has a computing unit, for example a microcontroller core. The sleep mode is preferably exited when the symbol counter generates an interrupt upon reaching a programmed count value and thus wakes both a computing unit (controller) and the circuit.

According to an embodiment, the control circuit can have additional switching means for switching between the output signals of the system clock generator and the sleep clock generator. The additional switches are, for example, gates, transmission gates, and/or semiconductor switches.

According to an embodiment, the sleep clock generator can have a frequency multiplier for multiplying a frequency of the second quartz crystal of the sleep clock generator to produce the output clock signal.

Output clock signals of the sleep clock generator that are masked (subtracted) can be distributed in order to approximate the system time of the circuit to the system time of the radio system.

In an embodiment, provision can be made for the purpose that the logic element is designed for distribution of the blanked pulses of the output clock signal of the sleep clock generator. The logic element preferably has a ring counter and a selector circuit to output a value as a function of the count value of the ring counter. Preferably, the values are binary and advantageously have only the values "zero" and "one."

In an embodiment, provision is made that the logic element can be designed to add a constant factor—in particular, twenty—to the value and to output the sum of the addition as the at least two integer divisor values to the control input of the modulo divider. To add the factor twenty with only a single bit, only the lowest binary position of the factor needs to be changed for this bit.

According to an embodiment, the selector circuit can have a multiplexer and a vector produced by fixed wiring. Alternatively, it is possible to generate the vector by means of a circuit section or an additional external circuit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the FIGURE illustrates a schematic block diagram of a circuit of a radio system.

DETAILED DESCRIPTION

The symbol period used for the radio system according to the industry standard IEEE 802.15.4 is 16 µs. If the radio system is in an operating mode (active state), the 16 MHz system clock can be used as the time base for a system time. In a sleep mode (inactive state), this system clock generator is switched off, and only a quartz clock crystal (RTC, real-time clock) with a frequency of 32.768 KHz is available. Doubling the frequency to 65.536 KHz results in a period of 15.258 µs, which differs significantly from the desired symbol period of the system time of the radio system.

The block diagram shown in the FIGURE makes it possible to limit the possible count error to one symbol period independent of the operating time of the symbol counter. Of course, the quartz clock crystal here is not ideal either, and can cause an additional error as a result of frequency deviations. As a result of this error and other error sources, such as the system clock, synchronization in the radio system may be necessary.

The FIGURE shows a schematic block diagram of a radio system circuit.

The circuit according to the FIGURE has a logic element 500. This has a counter 510 that counts between 0 and 758 as a ring counter. A selector circuit is comprised of the hardwired vector 520 and the multiplexer 530 of the logic element 500. A bit from the vector 520 is selected by the ring counter 510. If this bit has the value "one," a divisor value k of the modulo divider 400 is set to the value "twenty-one." If the bit has the value "zero," the divisor value k of the modulo divider 400 is set to "twenty." To this end, the bit is added to the constant factor 540 "twenty" by means of the adder 550. For this purpose, it is sufficient to change the lowest binary place of the factor 540, for example by appropriate wiring.

An output of the logic element 500 for output of the divisor value k is connected to a control input 420 of the modulo divider 400. In contrast, the input of the ring counter 510 of the logic element 500 is connected to an output of the modulo divider 400.

Every time the output of the modulo divider 400 is equal to zero, counting by a symbol counter 300 is suppressed. The output of the symbol counter 300 expresses the counted system time $t_S$ as a 32-bit wide data word according to the number of counted symbols. The system time $t_S$ is divided into symbols. To suppress counting, a logic zero arrives at the control input of the switch 700. At the same time, the ring counter 510 is incremented, and thus the next bit in the vector 520 is selected. The switch 700 and the counter 300 can be designed together in one circuit unit that encompasses the two functions of switching and counting.

A system clock generator 100 can be connected to the symbol counter 300 through the switch 610. The system clock generator 100 has a quartz crystal 110 with a quartz crystal frequency $f_S$ of 16 MHz, which is output at an output 102 for clocking a digital circuit in an operating mode. The frequency $f_S$ of the quartz crystal 110 is an integer multiple of a symbol frequency. Therefore, the system clock generator 110 also has a frequency divider 120 to output symbols to be counted in the operating mode, wherein the frequency divider 120 divides the frequency $f_S$ of the quartz crystal 110 by the factor 256. Thus, symbols to be counted are output at the output 101 of the system clock generator 100 with a symbol period of 16 μs.

The circuit of the example embodiment in the FIGURE also has a sleep clock generator 200 with another quartz crystal 210. The quartz crystal frequency of the additional quartz crystal 210 is 32.768 KHz, so that the period 15.2587 μs deviates from the symbol period of 16 μs of the radio system. The output frequency $f_R$ of an output clock signal of the sleep clock generator 200 is thus a non-integer multiple of the symbol frequency. The least common multiple is at 250,000 μs (¼ s). Within 250 ms, 759 pulses of the sleep clock generator must not be counted so that after 250 ms the symbol counter 300 has the same count value (system time $t_S$) as in the operating mode with the more exact system clock of the system clock generator 100.

A uniform distribution of these omitted pulses of the sleep clock generator within the time period of 250 ms means that, theoretically, a pulse must be left out after every 20.586 pulses. However, since only whole pulses can be counted, this means that a pulse must be left out 445 times after 21 pulses, and 314 times after 20 pulses. A division by the divider values 20 and 21 is provided by the modulo divider 400. The selection of the divisor value k here is accomplished by the logic element 500. By this means, the maximum count error in the symbol counter is no larger than one symbol period. The count error is reduced to zero after every 250 ms. This achieves the surprising result that the total deviation resulting from count errors for an infinite run time is never greater than one symbol period.

To omit the pulses of the sleep clock generator, a switch 700 is provided that is designed to form the symbols to be counted by blanking the output clock signal of the sleep clock generator 200 in sleep mode.

One input 410 of the modulo divider 400 is connected to an output 201 of the sleep clock generator 200 for division by the divisor value k. The output of the modulo divider 400 is connected to an input en of the switch 700 for blanking by means of the output signal of the modulo divider 400.

With this solution of the example embodiment in the FIGURE, it is possible to place the circuit of the radio system in a sleep mode for an extended period of time. Only the quartz clock crystal 210 (RTC) is needed in order to operate the symbol counter, by which means the power consumption can be reduced considerably. After the sleep mode ends, it is possible to wake the circuit with approximate symbol accuracy.

To switch between sleep mode and operating mode, it is possible to provide a control circuit 600, which in the example embodiment of the FIGURE also has the switch 610, 620, and 640 for switchover between the output signal of the system clock generator and the output signal of the sleep clock generator. In an alternative variant embodiment, a multiplexer that is connected to the output 101 of the system clock generator 100 and the output 201 of the sleep clock generator is used for switchover.

The invention is not restricted to the variant embodiments shown in the FIGURE. For example, it is possible to provide the system time for a different radio network, for example according to a different industry standard such as IEEE 802.11.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit comprising:
   a symbol counter configured to provide a system time from a plurality of counted symbols, the system time being divided into symbols;
   a system clock generator connectable to the symbol counter, the system clock generator having a first quartz crystal whose frequency is an integer multiple of a symbol frequency and having a frequency divider configured to output symbols that are to be counted in an operating mode by dividing the frequency of the first quartz crystal;
   a sleep clock generator having a second quartz crystal, an output frequency of an output clock signal of the sleep clock generator being a non-integer multiple of the symbol frequency;
   a switch configured to produce the symbols to be counted by blanking the output clock signal of the sleep clock generator in a sleep mode;
   a modulo divider connectable to an output of the sleep clock generator and switchable between at least two integer divisor values, an output of the modulo divider being connectable to a control input of the switch to blank out the output clock signal via the modulo divider; and
   a logic element connectable to a control input of the modulo divider, the logic element configured to control a division factor of the modulo divider by changing a division factor of the modulo divider.

2. The circuit of claim 1, further comprising a control circuit that is configured to activate the system clock generator for the operating mode and deactivate the system clock generator for the sleep mode.

3. The circuit of claim 2, wherein the control circuit has an additional switch that is configured to switch between the output signals of the system clock generator and the sleep clock generator.

4. The circuit of claim 1, wherein the sleep clock generator has a frequency multiplier configured to multiply a frequency of the second quartz crystal of the sleep clock generator to produce the output clock signal.

5. The circuit of claim 1, wherein the logic element has a ring counter and a selector circuit to output a value as a function of the count value of the ring counter.

6. The circuit of claim 5, wherein the logic element is configured to add a constant factor to the value and to output the sum of the addition as the at least two integer divisor values to the control input of the modulo divider.

7. The circuit of claim 5, wherein the selector circuit has a multiplexer and a vector produced by fixed wiring.

8. A method comprising:
- activating a system clock generator in an operating mode so that a system time is determined from an output clock signal of the system clock generator by counting, the system time being divided into symbols;
- deactivating the system clock generator into a sleep mode;
- blanking an output clock signal of a sleep clock generator as a function of an output signal of a modulo divider in the sleep mode; and
- determining the system time by counting;
- wherein an output frequency of the output clock signal of the sleep clock generator is a non-integer multiple of a symbol frequency,
- wherein the modulo divider divides the output clock signal of the sleep clock generator by a divisor, and
- wherein a division factor of the modulo divider is produced by changing between at least two integer divisor values.

9. The method of claim 8, comprising activating the system clock generator for the operating mode using a control circuit and deactivating the system clock generator for the sleep mode using the control circuit.

10. The method of claim 9, comprising switching between the output signals of the system clock generator and the sleep clock generator.

11. The method of claim 8, wherein:
- the system clock generator has a first quartz crystal;
- the sleep clock generator has a second quartz crystal; and
- the method comprises multiplying a frequency of the second quartz crystal of the sleep clock generator to produce the output signal.

12. The method of claim 8, comprising outputting a value as a function of a count value of a ring counter.

13. The method of claim 12, comprising:
- adding a constant factor to the value; and
- outputting the sum of the addition as the at least two integer divisor values to the control input of the modulo divider.

14. A system comprising:
- means for activating a system clock generator in an operating mode so that a system time is determined from an output clock signal of the system clock generator by counting, wherein the system time is divided into symbols;
- means for deactivating the system clock generator into a sleep mode;
- means for blanking an output clock signal of a sleep clock generator as a function of an output signal of a modulo divider in the sleep mode; and
- means for determining the system time by counting;
- wherein an output frequency of the output clock signal of the sleep clock generator is a non-integer multiple of a symbol frequency,
- wherein the modulo divider divides the output clock signal of the sleep clock generator by a divisor, and
- wherein a division factor of the modulo divider is produced by changing between at least two integer divisor values.

* * * * *